United States Patent [19]
Felker

[11] 3,872,207
[45] Mar. 18, 1975

[54] METHOD OF FORMING TIRE TREADS WITH ELONGATED TRACTION-AUGMENTING ELEMENTS

[76] Inventor: Paul J. Felker, 211 W. First St., Marshfield, Wis. 54449

[22] Filed: Mar. 17, 1970

[21] Appl. No.: 20,356

[52] U.S. Cl. .................................. 264/277, 264/326
[51] Int. Cl. ............................................. B29h 17/00
[58] Field of Search ....... 18/42 T, 44; 152/210, 211; 264/275, 277, 326

[56] References Cited
UNITED STATES PATENTS
2,848,744  8/1958   Crooker .................................. 18/44
3,003,534  10/1961  Cousins .................................. 152/211
3,283,053  11/1966  Felker .................................... 264/277

Primary Examiner—Robert F. White
Assistant Examiner—W. E. Hoag
Attorney, Agent, or Firm—Arthur L. Morsell, Jr.

[57] ABSTRACT

The tire-forming matrix and method have elongated zigzag ribs which are spaced apart to provide grooves for receiving and centering metal traction-augmenting coils. The sides of the ribs have peaks and valleys and peaks of a rib on one side of a received coil are disposed opposite the valleys of the rib on the other side of the coil, and sipe-forming strips are caused to project transversely from each valley, which strips aid the peaks in centering the wire coil. When the tire tread is molded the valleys at the sides of the matrix ribs provide a row of triangular rubber blocks on each side of each rider strip which project beyond the sides of the coil, and the sipe strips are positioned to break up these rubber blocks and provide more movement on the tire tread.

3 Claims, 5 Drawing Figures

PATENTED MAR 18 1975  3,872,207

INVENTOR
PAUL J. FELKER

BY
Morsell & Morsell
ATTORNEY

METHOD OF FORMING TIRE TREADS WITH ELONGATED TRACTION-AUGMENTING ELEMENTS

BACKGROUND OF THE INVENTION

1. Field of the Invention

The present invention pertains to the retreading of tires or to the manufacture of new tires wherein the tread portion has elongated, circumferentially-extending rider strips with traction-augmenting members, such as wire coils, in the rider strips.

2. Description of the Prior Art

It has heretofore been proposed to retread tires or to manufacture new tires with wire coils embedded in the rubber of the rider strips. The proper positioning of the coils during tread molding has always presented problems. Heretofore it has been customary to cut a length of wire coil approximately two inches longer than the circumference of the tire and to insert by hand one of these coils in each of the grooves of the matrix with ends abutting. With this arrangement the wire coils are longitudinally compressed because of their greater length and they thereby maintain themselves in the grooves of the matrix. With this early method of procedure, centering of the coils in the grooves presented a problem, but in Crooker U.S. Pat. No. 2,619,678 this problem was dealt with by having a centering channel in the bottom of each of the matrix grooves. In my prior U.S. Pat. No. 3,283,053, circumferential extends of sipe-forming strips were used in wide grooves of the matrix for centering wire coils in the grooves. In Spitz U.S. Pat. No. 2,832,292, a method is shown which involves the use of peculiarly-shaped wire coils having projecting wings for centering the coils in the grooves. It is desirable to provide a simpler method which can be used with standard coils and which does not require the use of the centering channel in the bottom of the groove as in the Crooker patent, and which can employ a simpler type of siping than that required by my U.S. Pat. No. 3,283,053.

SUMMARY OF THE INVENTION

The present invention provides a matrix and method wherein the matrix is formed with specially arranged, spaced zigzag ribs, with the sides of each rib having peaks and valleys which are opposite like peaks and valleys on the other side of a matrix groove, the valleys being sufficiently short in circumferential length that the elongated traction-augmenting member is caused to be centered between peaks, whereby a tire tread may be formed with spaced zigzag ribs, each rib having a coil therein. In the preferred embodiment of the invention sipe-forming strips are caused to project transversely from each of the valleys of the matrix ribs, which strips, while not essential for the centering of the coil, nevertheless coact with the peaks in accomplishing such centering.

A general object of the invention is to provide a matrix and method wherein there is improved means and method for centering the coils in the grooves of the matrix without the necessity of utilizing centering channels.

A further object of the invention is to provide an improved matrix and method wherein the matrix has spaced zigzag ribs for receiving coils therebetween, the coils being centered between the peaks at the sides of the zigzag ribs.

A further object of the invention is to provide a matrix and method wherein, when sipe strips are used, the length of each sipe strip is approximately the depth of a valley, each sipe strip creating a sipe in the tire to break up one of the triangular blocks of rubber which is formed at the sides of the rider strips to render these blocks more flexible.

A further object of the invention is to provide an improved matrix and method as above described wherein short sipe strips are arranged in the matrix in such a manner as not to interfere with the insertion of the coils while aiding in the centering thereof, and while providing a sipe for each of the triangular blocks of rubber which is to be formed on the sides of the rider strips, thereby providing rider strips on the tread which have more action.

A further object of the invention is to provide an improved matrix and method of manufacturing tires which allows for the usual variations in manufacture without detrimentally affecting the proper centering of the coils.

A further object of the invention is to provide an improved tire having traction-augmenting members in the rider strips thereof, wherein each rider strip has a row of triangular blocks of rubber on each side projecting beyond the sides of the coil, to thereby create ample stock to maintain the coils in the rider strips during use.

With the above and other objects in view, the invention consists of the improvements in the art of forming tire treads with elongated traction-augmenting elements, and all of its parts, combinations, and steps, as set forth in the claims, and all equivalents thereof.

BRIEF DESCRIPTION OF THE DRAWINGS

In the accompanying drawings, illustrating one complete embodiment of the preferred form of the invention, in which the same reference numerals designate the same parts in all of the views.

DESCRIPTION OF THE PREFERRED EMBODIMENT

Figure 1:
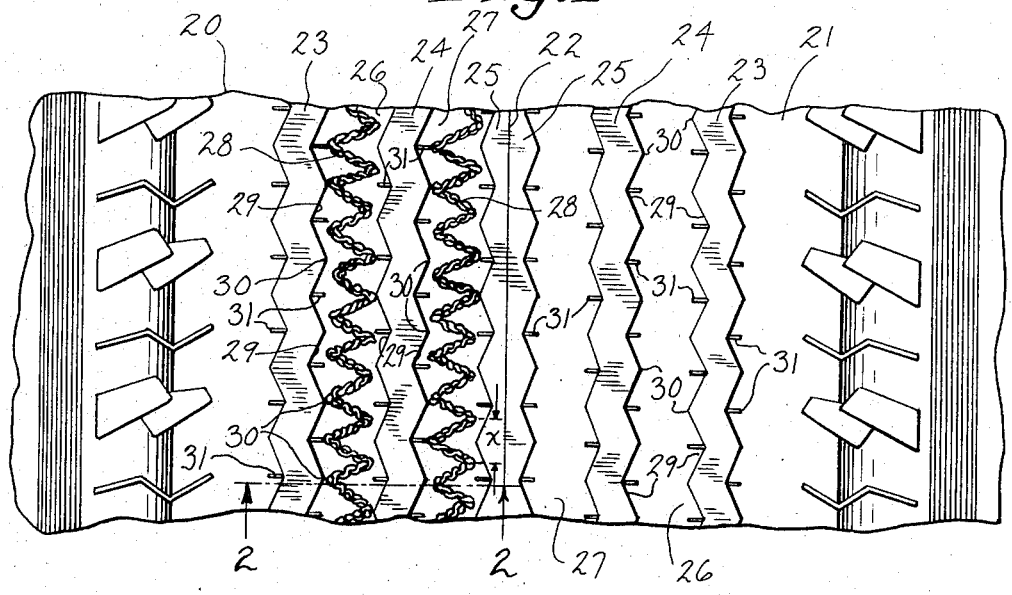
FIG. 1 is a fragmentary view looking at the interior of a tread-forming matrix showing wire coils inserted in two of the grooves of the matrix.

Referring now more particularly to FIG. 1 of the drawings, the improved matrix may be used either for retreading operations or for the manufacture of new tires. It includes complementary circular matrix sections 20 and 21 which meet at a circumferential parting line 22. These matrix sections are designed for use in a mold in the manner shown in FIGS. 1 and 2 of Crooker U.S. Pat. No. 2,619,678, the operation of which is fully described in said patent. In this prior patent the centering channels in the bottoms of the rider strip-forming grooves maintain the coils in a laterally-centered position in the grooves of the matrix during the curing operation and prevent the coils from bowing from one side to the other of the grooves. Such bowing would be unacceptable in practice as the sides of the coil are then not protected by enough rubber in the finished product and the coils may work loose in use.

Figure 3:
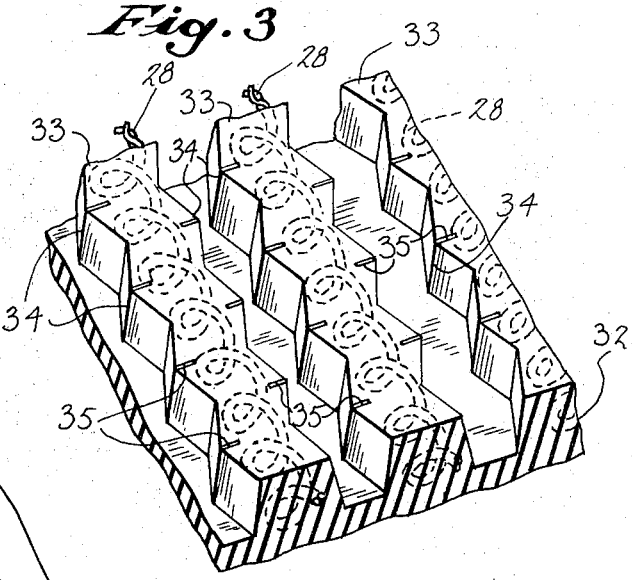
FIG. 3 is a fragmentary view of a tire tread showing several of the rider strips with wire coils therein.

The matrix sections have circumferentially-extending ribs 23 and 24 on each half, and each half has a longitudinal half 25 of a center rib, one on each side of the parting line 22. The spaces between the ribs 23 and 24 provide rider strip-forming grooves 26 and 27 which form the rider strips 126 and 127 on the finished tire, as shown in FIG. 3. Any selected number of ribs 23–24 may be provided in the matrix depending upon the number of rider strips desired on the tire. In the arrangement embodied in FIG. 1 there are four rider strip-forming grooves.

As a novel feature of the present invention each of the matrix ribs is shaped in a special manner to provide centering for the wire coils 28 or other elongated traction-augmenting elements while still providing stock at the sides of the coils to furnish protection so that the coils will not work loose in use. To accomplish this purpose the matrix ribs 23, 24 and 25 are zigzag in plan view and have sides with alternating peaks 30 and valleys 29. The valleys 29 of the rib 23 on one side of a coil are opposite peaks 30 of the rib 24 on the other side of the coil 28, referring to the left-hand coil in FIG. 1.

Figure 4:
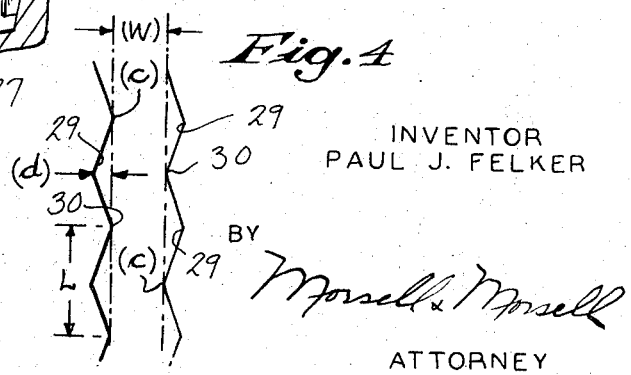
FIG. 4 is a diagrammatic plan view of a matrix groove.

Referring to FIG. 4, the circumferential distance (L) between peaks is relatively short and, in a preferred arrangement, ¾ inches or less for a passenger car tire. The unobstructed channel portion within each of the grooves 26 or 27 has a width (W) which is of between 5/16 and 7/16 inches for a passenger car tire to receive traction-augmenting members which are of no greater width, the standard coil for a passenger car tire having a diameter of ⅝ inches, with the coil having approximately four turns to the inch. The depth (d) of each valley is preferably at least ⅛ inches for a standard passenger car tire. While the wire is preferably flexible, nevertheless, due to the short distance (L) between peaks, the wire is of such property that it is unable to flex sidewise into the valleys 29 of the ribs after the coils are inserted to the position shown in FIG. 1, the coils preferably having a greater number of pitch distances, (x) FIG. 1, per unit of length than the number of matrix peaks per unit of length so that the pitch sequence of the coil is out of sequence with the peaks of the matrix. Thus the coil will not straddle a series of peaks and will have positive centering between peaks on alternating sides of the matrix groove. With this arrangement lengths of wire coil approximately 1 inch longer than the circumference of the tire, for passenger car tires, may be inserted in each of the grooves 26 and 27 in the manner shown in FIG. 1 with the ends of the coil abutting. With this arrangement the coils are longitudinally compressed somewhat and tend to maintain themselves seated in the grooves of the matrix. With the novel method of the present invention, and with the use of the novel matrix, each coil 28 is automatically centered in its groove, as shown in FIG. 1. With the present invention, in the manufacture of the matrix ribs, a constant pitch (distance between peaks 30) can be employed as this is the simplest procedure in manufacture, and in manufacture of the wire coils there is no need to worry about maintaining any special tolerances or consistency in the pitch of the convolutions. As a matter of fact, the poorer the coil is in this respect, the better the centering in the mold.

As a typical example for a passenger car tire it may be assumed that (W) in FIG. 4 is ⅜ inches, (L) is ¾ inches, and that the coil has approximately 48 turns to the foot, this, of course, varying somewhat due to tolerances and inconsistencies in manufacture. With this general relationship, if the pitch distances of the coil, in an axial direction as at (d) FIG. 1, were perfectly constant, which they are not, the coil would contact a peak as at (C) on the left-hand side of FIG. 4, and would then have another contact no farther away than (C) on the right-hand side of FIG. 4. If all of the pitch distances were constant there would be contact every 1⅛ inches. However, because there will be imperfections and inconsistencies in manufacture in both the matrix and the coils, this contact may vary somewhat around the circumference of the tire, it being noted that the peaks 30 extend at right angles to the bottom of the grooves 27 whereas the sides of the coils have angularly-extending portions which cross the peaks at about a 30° angle so that there will always be sufficiently frequent contact between the coil and some of the peaks 30 to provide positive centering of the relatively stiff wire coil. Furthermore, where the sipe strips are employed, their end edges extend parallel to the peaks 30 and will be crossed at about a 30° angle by portions of the coil convolutions so that the sipe strips also aid in positive centering.

Figure 2:
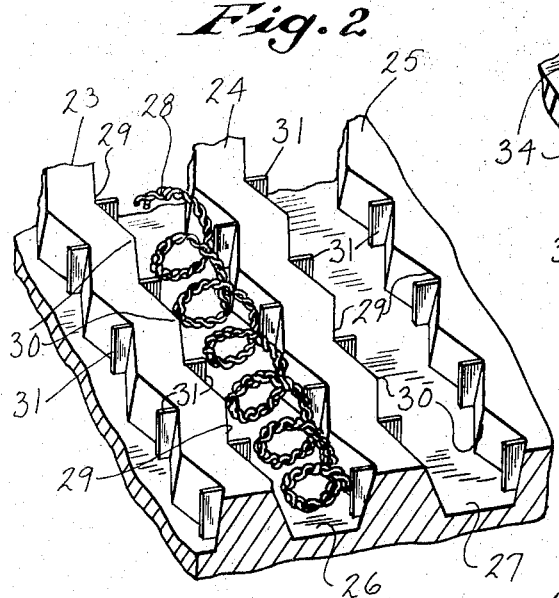
FIG. 2 is a fragmentary perspective view showing a portion of the matrix interior with one coil centered in a groove.
Figure 5:
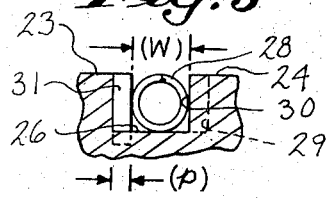
FIG. 5 is a fragmentary cross section through one of the matrix grooves showing a coil therein.

An additional feature of the novel method which is not essential in practice but which is very desirable in the final product is to equip the matrix with relatively short metal sipe-forming strips 31, with one strip projecting laterally from the bottom of each valley 29, as shown in FIGS. 1 and 2. Each strip 31 has a transverse length which is limited so that it projects as at (p) in FIG. 5 approximately the same distance as the adjacent peaks 30. In the case of a standard passenger car tire this is preferably at least ⅛ inches. These strips, being short, do not interfere with the groove width (W) of FIG. 1 so that the coils may be readily inserted without interference from the sipe strips. In addition, the ends of the sipe strips will frequently contact portions of the wire coils due to the varying pitch sequence between the matrix and the coil, as may be seen in FIGS. 1 and 2, to further aid in centering the latter.

With coils in all of the grooves 26–27 of the matrix, when the procedure is used for retreading, the curing bag or curing tube of the mold is inflated and this inflation pressure forces the uncured rubber of the tread stock against the hot matrix, the uncured rubber being forced into the pattern of the matrix. After a predetermined period of exposure to the heat and pressure the curing of the rubber is completed and the tire is removed from the matrix. When the mold is in closing condition the ribs 23, 24 and 25 of the matrix enter the tread stock and the rubber of the tread stock is forced to flow into the grooves 26 and 27 to fill the grooves and cure around the wire coils 28, as is shown in FIG. 3. A very similar procedure may be used in the building of new tires.

In FIG. 3, showing the novel tire tread, the numeral 32 designates the tread stock having zigzag ribs 33 thereon, each rib having a centered coil 28 therein. It is to be noted that on each side of each coil there is a circumferential series of triangualr rubber blocks 34 which project beyond the sides of the coils to provide sufficient stock for protection of the coils so they do not work loose in use. Where the sipe-forming strips 31 are employed in the matrix there will be sipe slits 35 extending inwardly from the peak of each triangular block 34. These slits break up the solid rubber portions of the rider strips and bring about a desired flexibility of action during use. Besides centering the coils, the novel method and matrix create rider strips on the tire which improve traction due to the zigzag configuration.

While this invention is particularly adapted for use in connection with wire coils, it is obvious that it is applicable for use in connection with various other types of elongated traction-augmenting elements which require centering, a number of which are illustrated and described in my U.S. Pat. No. 3,283,053.

It is to be understood that I do not desire to be limited to the exact details of construction shown and described, for obvious modifications will occur to a person skilled in the art.

What I claim is:

1. In a method of forming non-skid tire treads with the use of a tire molding machine of a type which has a matrix provided with circumferentially-extending laterally-spaced ribs to provide rider strip-forming grooves therebetween, the steps of forming said ribs with zig-zag sides to provide alternating short peaks and valleys while maintaining a relatively straight clear space between ribs, inserting sipe-forming strips in said valleys of the matrix ribs to project transversely approximately the same distance as the altitude of said peaks, inserting elongated traction-augmenting members, each of a width to be received between the peaks of a pair of matrix ribs and of a width to be received in said clear space without substantial bowing, in substantially straight lines in said matrix grooves to extend around the circumference of the matrix whereby said members will be centered between peaks of the matrix ribs and between the ends of the sipe-forming strips, and then, while the traction-augmenting members are thus held, forming a tire tread with the traction-augmenting members in the rider strips thereof, whereby said tread has traction-augmenting members disposed circumferentially about said tire and completely embedded within the rider strips thereof.

2. A method as defined in claim 1 in which the peaks of the rib on one side of a groove are formed opposite the valleys of the rib on the other side of said groove while maintaining lateral spacing between the peaks on one side and the peaks on the other side so as to provide said clear space for reception of the traction-augmenting members.

3. A method as claimed in claim 1 in which peaks on the ribs are caused to be spaced a relatively short distance apart circumferentially, and in which the elongated traction-augmenting members are metal coils, the method including the preparing of the coils so that the pitch and rigidity are such with respect to the circumferential distance between peaks on the ribs as to prevent the coils from bowing into the valleys.

* * * * *